Patented Mar. 18, 1952

2,589,655

UNITED STATES PATENT OFFICE 2,589,655

INTERPOLYMERS AND METHOD OF MAKING SAME

Frank Armitage and Eric Sydney John Fry, Homerton, London, England, assignors, by mesne assignments, to The Sherwin-Williams Company, Cleveland, Ohio, a corporation of Ohio No Drawing. Application July 27, 1950, Serial No. 176,254. In Great Britain August 5, 1949

25 Claims. (Cl. 260—22)

This invention relates to improvements in the manufacture of interpolymers of unsaturated aromatic hydrocarbons with drying oils, and the products thereof.

It has already been disclosed, inter alia, in U. S. Patent No. 2,392,710 that useful products can be obtained by the interpolymerisation of styrene with drying oils, the products being useful in the preparation of coating compositions for use in the field of paints and other coating and impregnating compositions and also in the manufacture of printing inks.

It has now been found that by substituting the aromatic monovinyl hydrocarbon, such as styrene or halogen or alkyl substituted derivatives thereof, either wholly or in part, by acenaphthylene or nuclear halogen or nuclear alkyl substituted derivatives thereof, there can be produced compounds which are useful in the above-mentioned fields. Many of the the interpolymers made with acenaphthylene and its derivatives as above mentioned, as described herein, are particularly useful as solventless insulating varnishes and for molding, laminating casting or as adhesives. Since acenaphthylene is almost completely non-volatile as compared with styrene, the present products are better for the above purposes than those produced with styrene.

Those derivatives of acenaphthylene which are useful in the present invention are those hydrocarbons and substituted derivatives thereof which are characterized by the presence therein of the structure of acenaphthylene,

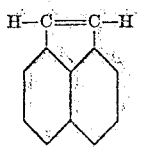

For example, halogen or alkyl substituted derivatives having one or more halogen atoms or alkyl radicals substituted for hydrogen on the naphthylene ring, for example, those derivatives in which methyl, ethyl, chloro or fluoro constituents have been substituted in the 1 to 8 positions of the naphthylene ring.

In the following description the term "acenaphthylene" will be used but it is intended that this term shall include the above mentioned substituted derivatives.

According to the present invention, there is provided a process for the manufacture of interpolymers which comprises heating acenaphthylene with one or more polyhydric alcoholic esters of one or more organic carboxylic acids, at least one of which acids contains ethylenic unsaturation, the other or others of which acids are either saturated or unsaturated or with the unesterified acids.

The term "polyhydric alcoholic esters" as used herein is intended to include compounds produced by the esterification of one or more polyhydric alcohol with one or more organic carboxylic acids, at least one of which acids contains ethylenic unsaturation, e. g. sorbic, cinnamic or acrylic acids, preferably conjugated unsaturation, and is preferably either a diene or a triene fatty oil acid, the other or others of the acids being either saturated or unsaturated carboxylic acids, such as those contained in naturally-occurring drying and semi-drying oils such as linseed oil, tung oil, dehydrated castor oil, perilla oil, sunflower seed oil, soybean oil, safflower seed oil, fish oils, cottonseed oil, corn oil, oiticica oil. It is intended that the term should also include the case where the polyhydric alcohol is, in part, esterified by the said fatty oil acids and, in part, by polybasic organic acids or anhydrides thereof such as phthalic or maleic acids and anhydrides, in which case it will be appreciated that the compounds include the well-known types of synthetic resins known generally as oil-modified alkyd resins. If desired the unsaturated fatty oil acids of the above oils may be reacted directly with the acenaphthylene or derivatives thereof.

We have found that the nature of the reaction may be modified in a variety of ways and the variation in the method of carrying out the reaction may be used to bring about variations in the properties of the final product.

According to one feature of the invention, the reaction is effected in solution in a neutral solvent for the ingredients and the interpolymerisation is effected by heating the reaction mixture under reflux; the said neutral solvent may be an aromatic solvent, such as xylol, which is commonly used in the paint art or other solvents also commonly used in the art may be employed.

A further feature of the invention consists in that the reaction is effected in the presence of a mono-cyclic alpha-terpene which may be present in addition to a solvent such as xylol.

The use of a mono-cyclic alpha-terpene has the effect of modifying the course of the interpolymerisation reaction and facilitates the production of products which are homogeneous and which produce a clear film.

A still further feature of the invention consists in that the reaction is effected in the presence of a small quantity of sulphur, for example ½ to 5% by weight of the polyhydric alcoholic ester.

Yet a further feature of the invention consists in that a small amount of a phenol, e. g. ½ to 5% by weight of the polyhydric alcoholic ester, is added to the reaction as a modifying agent. If desired, phenolic resins may be also incorporated into the reaction mixture.

We have found that, in some instances, a non-homogeneous product results if the whole of the desired quantity of acenaphthylene is added to the initial reaction mixture and a still further feature of the invention, therefore, consists in that the acenaphthylene may be added, in part, at the commencement of the reaction, the remainder being added during the course of the interpolymerisation reaction; the addition of acenaphthylene during the course of the reaction may take place either continuously or discontinuously, for example in two or four stages of about 50% or 25% respectively of the total amount of acenaphthylene.

If desired, polymerisation catalysts may be employed, amongst which may be mentioned peroxidic catalysts, such as benzoyl peroxide, and hydroperoxides, aluminium chloride or an activated clay; the blowing of air or oxygen through the reaction mixture may also have beneficial results.

The ratio by weight of the acenaphthylene (or mixture of acenaphthylene and styrene) to the polyhydric alcoholic esters may vary from about 5 to 1 to about 1 to 10 but preferably from about 3 to 2 to about 1 to 5 depending upon the uses to which the reaction products are to be put. When a mixture of acenaphthylene or its substituted derivatives and styrene or its substituted derivatives is used the ratio of the former to the latter is preferably not less than about 1 to 3. Where the products are to be used as surface coating media, the preferred proportion of acenaphthylene, or acenaphthylene plus styrene, is from about 20 to 40% by weight of the mixture thereof with the polyhydric alcoholic ester.

The interpolymerisation reaction is generally carried out below a temperature of 200° C. although temperatures as high as 250° C. may be used when desired. The time of reaction will vary from 1 to 2 hours when higher temperatures are used and may extend for about 48 hours when lower temperatures are used. Usually the time of reaction for any particular mixture is determined by the length of time necessary to obtain a clear homogeneous reaction product at the particular temperature being employed.

The following examples are illustrative of the manner in which the invention may be carried out:

*Example 1*

3 grams of acenaphthylene were dissolved in a mixture of 15 grams of isomerised, i. e. conjugated, linseed oil (sold under the registered trade-mark "Conlinol") and 25 grams of xylol. The reaction mixture was heated under reflux at 145° C. for 5¾ hours, at which stage the reaction mixture was clear and films poured therefrom were also clear. A further 3 grams of acenaphthylene were added at this point and heating was continued under reflux, test portions being removed from time to time and films poured from these test portions. The films produced from the earlier test portions were cloudy but films from the later test portions had a progressive increase in the clarity of the film until, after 22¼ hours, an almost completely clear film could be obtained. The final viscosity of the reaction mixture was below ½ a poise and the theoretical oil length was 70%. The reaction mixture was a star bright varnish having a colour of 15 in the Gardner scale.

With the addition of the conventional cobalt naphthenate driers, the reaction product produced a film which was touch dry in 4 hours.

*Example 2*

3 grams of acenaphthylene were dissolved in a mixture of 15 grams of isomerised linseed oil and 25 grams of dipentene.

The reaction mixture was heated under reflux at 186° C. for 3 hours to yield a clear solution. A further 3 grams of acenaphthylene were thereupon added and refluxing was continued for a further period of 3 hours. The reaction products was a star bright varnish having a colour of 13 to 14 on the Gardner scale, a viscosity of less than ½ a poise and a theoretical oil length of 70%.

With the addition of the conventional cobalt naphthenate driers, the reaction product produced a film which was touch dry in 1½ hours.

*Example 3*

6 grams of acenaphthylene were dissolved in 30 grams of isomerised linseed oil and produced a clear solution having a viscosity of 0.65 poise.

The solution was heated at 200° C. for ¾ hour whereupon the viscosity of the reaction mixture was found to be 3.4 poise. The varnish produced was slightly cloudy but became clear on warming.

The reaction mixture was extracted with alcohol and, from the extract, there was recovered 0.65 gram of a yellow oil. The extraction of a sample of 30 grams of the same conjugated linseed oil yielded an extract of 0.256 gram of yellow oil so that the assumption can be drawn that the reaction mixture itself only contains about 0.4 gram of unreacted acenaphthylene.

Residual alcohol remaining in the reaction product was removed by vacuum distillation and a further 6 grams of acenaphthylene were added to the residue which was then heated at 200° C. for a further period of 1 hour. The reaction product was cloudy and very viscous on cooling but, on the addition of xylol, an almost clear solution was obtained from which films could be poured which were only slightly cloudy.

On the addition of the conventional cobalt naphthenate driers, a clear film was obtainable which dried over-night to be almost tack free.

*Example 4*

10 grams of acenaphthylene and 10 grams of styrene were added to a mixture of 20 grams of isomerised linseed oil and 40 grams of xylol. The reaction mixture was heated under reflux at 152° C. and test portions were withdrawn at intervals and films poured from these test portions.

After two hours refluxing the films from the test portions were cloudy but the clarity of the films improved with further heating until, after 47½ hours, an almost clear film was obtainable.

The reaction product was a varnish which was almost star bright, had a colour 12 to 13 on the Gardner scale and a viscosity of less than ½ a poise; its solids content was 47.7% which corresponds to an 80% consumption of the styrene present in the initial reaction mixture.

On the addition of the conventional cobalt naphthenate driers, films could be poured which were touch dry and tack free in ten minutes.

Example 5

5 grams of acenaphthylene and 5 grams of styrene were added to a mixture of 15 grams of isomerised linseed oil and 25 grams of dipentene. The reaction mixture was heated under reflux for 7½ hours to produce a varnish which was star bright, had a colour of 10 to 11 on the Gardner scale and a viscosity of less than ½ a poise; the solids content was 45.2% and corresponds to a 52% consumption of the initial styrene content.

On the addition of the conventional cobalt naphthenate driers, a clear film was produced which was touch dry in 1½ hours.

Example 6

140 grams of acenaphthylene were added to a solution of 118 grams of isomerised linseed oil and 93 grams of raw wood oil dissolved in 351 grams of dipentene.

The reaction mixture was heated under reflux for 2½ hours at the end of which time 336 grams of dipentene were distilled off.

Sufficient aromatic white spirit was then added to produce a reaction mixture having a solids content of 74%.

400 grams of the solution of the reaction product in aromatic white spirit were taken and 140 grams of titanium dioxide pigment mixed therewith and conventional cobalt naphthenate driers added. The product could be brushed out to a gloss finish which became touch dry in 1½ hours. The paint thus produced had good flow characteristics.

Example 7

3 grams of acenaphthylene were added to a solution of 15 grams raw wood oil and 25 grams of xylene and the reaction mixture was heated under reflux at 150° C. After 6½ hours, a further 3 grams of acenaphthylene were added and the mixture was heated under reflux for a further 15 hours, the reaction mixture producing a clear film when poured.

Example 8

15 grams of acenaphthylene were added to a solution of 10 grams of raw wood oil and 25 grams of dipentene. The reaction mixture was refluxed at 188° C. and test portions were withdrawn at intervals and films poured therefrom. The films poured from the test portions were, in all instances, clear and, at the conclusion of 4½ hours refluxing, there was produced a clear varnish having a viscosity of 3.2 poises and a colour of 15 to 16 on the Gardner scale. The varnish had a theoretical oil length of 40% and, after addition of the conventional cobalt naphthenate driers, produced films which did not frost and which were touch dry and tack free in 40 minutes and were print free in 2¼ hours.

Example 9

6 grams of acenaphthylene were added to 30 grams of raw wood oil and 0.3 grams of finely divided sulphur added thereto. The reaction mixture was heated for 1 hour at 200° C. to produce a product which was clear on cooling but dark in colour (17 to 18 on the Gardner scale); this product had a viscosity of 0.63 poise.

On addition of conventional cobalt naphthenate driers to a portion of the reaction mixture, films could be poured which air-dried to produce webbing which, however, was absent in the case of a film produced without the cobalt naphthenate drier.

To the remainder of the reaction mixture, a further 6 grams of acenaphthylene were added and yielded a viscous liquid after a further period of heating at 200° C. for 1 hour. The reaction product at this stage was a viscous liquid having a viscosity of more than 100 poises which yielded clear films which showed no webbing either with or without driers.

On the addition of the conventional cobalt naphthenate driers was produced a film which was touch dry in 4 hours and which became tack free over-night.

The product which had a theoretical oil length of 70% was slightly opalescent, had a colour of 17 to 18 on the Gardner scale and was compatible with white spirit.

Example 10

3 grams of acenapthylene were added to 15 grams of a 7 poise dehydrated castor oil dissolved in 25 grams of xylol.

The reaction mixture was heated under reflux at 152° C. for 21½ hours when a slightly cloudy film was produced.

Example 11

5 grams of acenaphthylene and 5 grams of styrene were added to 15 grams of a 7 poise dehydrated castor oil and 0.15 gram of finely divided sulphur were added to the reaction mixture.

The reaction mixture was heated for 7½ hours at temperatures ranging from 170 to 200° C.

The reaction product was a cloudy, dark coloured balsam which, however, became clear on warming and, on solution in xylol, formed a clear solution from which clear films could be poured.

After addition of the conventional cobalt naphthenate driers, films poured became touch dry in 4 hours and were almost tack free overnight; the theoretical oil length of the final product was 60%.

Example 12

10 grams of acenaphthylene were added to 15 grams of 7-poise dehydrated castor oil dissolved in 25 grams of xylol and 1 gram of fuller's earth (Grade KN. 11C which had been dried in an oven at 120° C.) was added.

The reaction mixture was heated under reflux for 6 hours at the end of which time the fuller's earth was filtered off to yield a clear solution from which clear films could be poured.

The varnish had a colour of 17 on the Gardner scale and a viscosity of less than ½ a poise.

On addition of cobalt naphthenate driers, the varnish, which had a theoretical oil length of 60%, produced films which were touch dry in 2½ hours and showed only a slight clam overnight.

Example 13

10 grams of acenaphthylene were added to 15 grams of a 7-poise dehydrated castor oil dissolved in 25 grams of xylol and 1 gram of aluminium chloride was added to the solution.

The reaction mixture was heated under reflux at a temperature of 146° C. for 9 hours and pro-

Example 14

6 grams of acenaphthylene were added to 30 grams of alkali-refined linseed oil and 1 gram of finely divided sulphur was added thereto.

The reaction mixture was heated at 200° C. for 2 hours, at the end of which time the reaction product had a viscosity of 5 to 8 poises; the material produced was soluble in xylol but films poured therefrom would not dry either with or without the addition of the conventional cobalt naphthenate driers.

A further 6 grams of acenaphthylene were then added and dissolved in the mixture which was then heated for a further 7½ hours at 200° C., the product at that stage being a cloudy, dark coloured balsam which cleared on warming and which yielded clear solutions with xylol.

Films poured from this solution were clear and, on addition of cobalt naphthenate driers to the solution, films poured therefrom became touch dry overnight. The theoretical oil length of the product was 63%.

In order to test the degree of interpolymerisation of the acenaphthylene, 22.7 grams of the reaction product were subjected to 5 successive extractions with 25 cc. portions of boiling alcohol. The extract was vacuum distilled to yield residues, the first and second of which weighed 0.93 gram and 1.02 grams respectively and consisted of needle-shaped crystals in yellow oil. The third, fourth and fifth residues amounted to 0.66 gram, 0.61 gram and 0.62 gram respectively and successive residues contained diminishing quantities of crystals.

The total amount of crystals recovered from the residue amounted to 0.571 gram and, since the total acenaphthylene (i. e. the total of interpolymerised and unreacted acenaphthylene in the sample) was 7.9 grams, it can be calculated that the crystals formed 7.2% by weight of the total acenaphthylene.

The crystals differed from the crystal form of acenaphthylene and were therefore recrystallised from alcohol. It was noted that the mother liquor, after filtration, exhibited a marked fluorescence.

The melting point of the crystals, after recrystallisation, was 91 to 92° C. and a mixed melting point determination of the crystals with acenaphthylene was 70° C., demonstrating that the crystals were not acenaphthylene.

The melting point and crystal form of the crystals, however, correspond closely to those for acenaphthene which, coupled with the phenomenon of fluorescence in the mother liquid, might suggest that a dismutation reaction of the type described by Dolinski and Dziewonski (Berichte der Deutschen Chemischen Gesellschaft, volume 48, page 1917 (1915)), had occurred although it is possible that some or all of the acenaphthene was present in the original acenaphthylene as an impurity.

In carrying out a comparison extraction, 15 grams of alkali refined linseed oil were extracted with 25 ccs. of boiling alcohol and, on vacuum distillation, left a residue of 0.64 gram of oil. It would therefore appear that very little, if any, acenaphthylene remained unreacted, at least 95% of the acenaphthylene in the reaction mixture being either polymerised or interpolymerised.

Example 15

2.5 grams of tung oil, 2.5 grams of acenaphthylene and 5 grams of xylene were heated for 12 hours in a sealed glass tube at 180-190° C. The product had a viscosity of 6 poise and was slightly opalescent. Upon addition of cobalt driers, the product gave a clear film which was touch dry in 1½ hours.

In Examples 16, 17 and 18 a 65% oil length dehydrated castor oil-modified alkyd resin was used which was prepared as follows:

3450 grams of dehydrated castor oil, 1355 grams of phthalic anhydride and 615 grams of glycerol were heated to 520° F. during a period of 1 hour and held at that temperature for 2½ hours while passing a stream of carbon dioxide through the reaction vessel. The final acid value of the alkyd resin thus produced was 12 mg. of KOH per gram and the viscosity of a 75% solids solution in xylol was 4 poise at 25° C.

Example 16

50 grams of a 65% oil length dehydrated castor oil modified alkyd were mixed with 5 grams of acenaphthylene and 0.5 gram diphenylol propane. The mixture was heated at 200° C. with stirring for 15 minutes, after which time 5 additional grams of acenaphthylene were added. Heating was continued at 200° C. for ¾ hour. The homogeneous product was dissolved in xylene and the solution, with cobalt driers, gave a clear film which was touch dry in 3 hours.

Example 17

40 grams of a 65% oil length dehydrated castor oil modified alkyd were mixed with 10 grams of acenaphthylene and 1 gram of fuller's earth 249. This mixture was heated with stirring under reflux for 1¼ hours at 330° F. The product was soluble in xylene and after filtration to remove the fuller's earth, the product, with cobalt driers, gave a clear air-drying film. This interpolymer is compatible with urea-formaldehyde resins, giving a hard tough film when mixed with 20% urea-formaldehyde resin and baked for ½ hour at 120° C.

Example 18

112 grams of a 65% oil length dehydrated castor oil modified alkyd were mixed with 22.5 grams of acenaphthylene, 15.0 grams of styrene, 100 grams of xylene and 2 grams of benzoyl peroxide. This mixture was heated for 2¼ hours at 120° C. 2 grams of tertiary butyl hydroperoxide were then added and the mixture heated for a further ½ hour at 120-130° C. A chromatographic analysis indicated that 48% of the acenaphthylene had been polymerised and a determination of non-volatiles indicated that 47% of the styrene had been reacted. The solution produced clear films. When this product was blended with a mixture of urea-formaldehyde resin and melamine-formaldehyde resin the product formed a hard tough film when baked for ½ hour at 200° F.

In Example 19 a 60% oil length dehydrated castor oil modified alkyd resin was used which was prepared as follows:

1940 grams of dehydrated castor oil, 975 grams of phthalic anhydride and 450 grams of glycerol were heated to a temperature of 510° F. during a period of 1½ hours and held at that temperature for 1¾ hours; the temperature was then allowed to fall to 475° F. and was held at that temperature until the acid value fell below 20 mg. of KOH per gram. The viscosity of a 60% solids solution in xylol was 1.25 poise at 25° C.

*Example 19*

224 grams of a 60% oil length dehydrated castor oil modified alkyd were mixed with 45 grams acenaphthylene, 30 grams styrene, 200 grams xylene and 0.75 gram of benzoyl peroxide. The mixture was heated for 3 hours at 135–140° C. and then 0.75 gram of tertiary butyl hydroperoxide were added. The mixture was then heated at the same temperature for an additional 3 hours. After which, 0.75 gram of tertiary butyl hydroperoxide was again added. The reaction mixture was heated again for 2 additional hours at 135–140° C. The resulting solution was opalescent but could be clarified by filtering and gave clear films. When the clarified solution was blended with urea-formaldehyde resin, a hard tough clear film was obtained upon baking for ½ hour at 200° F.

*Example 20*

6 grams of tung oil, 30 grams of acenaphthylene and 1 gram of benzoyl peroxide were heated together at 75° C. until a mobile homogeneous reaction product was obtained. A film of this product, when baked for 7 hours at 120° C. gave a clear, hard finish.

*Example 21*

30 grams of tung oil, 30 grams of acenaphthylene and 0.9 gram of benzoyl peroxide were heated at 75° C. until a mobile homogeneous reaction product was obtained. A film of this product, when maked at 120° C. for 5½ hours gave a clear, tough gel.

*Example 22*

An oil modified alkyd was prepared by mixing 30 grams of sunflower fatty acids, 30 grams of castor oil, 36.4 grams of phthalic anhydride, 36.4 grams of maleic anhydride and 44 grams of ethylene glycol. This mixture was heated at 190° C. for 1 hour and at 220–230° C. for an additional 1½ hours. After cooling, the product was thinned with styrene until it contained 67% solids and had a viscosity of 4 poise.

20 grams of the above alkyd was mixed with 1.5 grams of styrene, 0.9 gram of acenaphthylene, 0.18 gram of benzoyl peroxide and 0.22 gram of cobalt driers and heated together at 120° C. for 2½ hours, and produced a tough, clear gel which was free from surface wrinkling.

*Example 23*

20 grams of the oil modified alkyd described in Example 22 was mixed with 1 gram of styrene, 1.4 grams of acenaphthylene, 0.18 gram of benzoyl peroxide and 0.22 gram of cobalt driers. This mixture was heated at 200° C. for 2½ hours, and produced a tough, clear gel free from surface wrinkling.

Although the present invention has been illustrated by the foregoing examples, it will be understood that such examples are illustrative and not limitative and that various modifications will be obvious to those skilled in this art and that such modifications are to be regarded as being embodied within the scope of the present invention.

What is claimed is:

1. A process for the production of interpolymers comprising heating a mixture comprising at least one fatty acid compound selected from the group consisting of drying and semi-drying fatty oils, drying and semi-drying fatty oil acids and drying and semi-drying oil modified alkyd resins, and an acenaphthylene compound selected from the group consisting of acenaphthylene, nuclear halogen substituted derivatives thereof, and nuclear alkyl substituted derivatives thereof, the heating being continued until the reaction product is substantially clear and homogeneous.

2. A process as claimed in claim 1 wherein the heating of the mixture is carried out under reflux conditions.

3. A process as claimed in claim 1 wherein the heating is carried out at a temperature below about 250° C.

4. A process as claimed in claim 1 wherein the ratio by weight of the fatty acid compound to the acenaphthylene compound varies from about 5 to 1 to about 1 to 10.

5. A process as claimed in claim 1 wherein the ratio by weight of the fatty acid compound to the acenaphthylene compound varies from about 3 to 2 to about 1 to 5.

6. A process as claimed in claim 1 wherein the reaction is carried out for from about 2 hours to about 48 hours.

7. A process as claimed in claim 1 wherein the fatty acid compound comprises naturally-occurring drying oils.

8. A process as claimed in claim 1 wherein the fatty acid compound comprises drying oil modified alkyd resins.

9. A process as claimed in claim 1 wherein the fatty acid compound comprises isomerized linseed oil.

10. A process as claimed in claim 1 wherein the fatty acid compound comprises tung oil.

11. A process as claimed in claim 1 wherein the fatty acid compound comprises dehydrated castor oil.

12. A process as claimed in claim 1 wherein the fatty acid compound comprises a dehydrated castor oil modified alkyd resin.

13. A process as claimed in claim 1 wherein the fatty acid compound comprises a castor oil modified alkyd resin, said resin being prepared from sunflower seed fatty acids, phthalic anhydride, maleic anhydride and ethylene glycol.

14. A process as claimed in claim 1 wherein a compound selected from a group consisting of styrene, halogen substituted styrene, and alkyl substituted styrene is added to the mixture.

15. A process as claimed in claim 14 wherein the ratio by weight of the acenaphthylene compound to the styrene compound is not less than about 1 to 3.

16. A process as claimed in claim 1 wherein the acenaphthylene compound is acenaphthylene.

17. A process as claimed in claim 1 wherein the reaction is carried out in the presence of a polymerisation catalyst.

18. A process as claimed in claim 1 wherein the reaction is carried out in the presence of a solvent for said mixture.

19. A process as claimed in claim 1 wherein the reaction is carried out in the presence of a solvent for the mixture and a mono-cyclic alpha-terpene.

20. A process as claimed in claim 1 wherein the reaction is carried out in the presence of from about ½% to 5% by weight of sulphur based on the amount of the fatty acid compound.

21. A process as claimed in claim 1 wherein the acenaphthylene compound is added stage-wise during the course of the reaction.

22. A process as claimed in claim 21 wherein the acenaphthylene compound is added stagewise during the reaction in amounts of about 25% of the total quantity employed.

23. The interpolymerisation product of at least one polyhydric alcoholic ester of an unsaturated fatty oil acid and an acenaphthylene compound selected from the group consisting of acenaphthylene, nuclear halogen substituted derivatives thereof, and nuclear alkyl substituted derivatives thereof.

24. The interpolymerisation product of at least one fatty acid compound selected from the group consisting of drying and semi-drying fatty oils, drying and semi-drying fatty oil acids and drying oil modified alkyd resins, and an acenaphthylene compound selected from the group consisting of acenaphthylene, nuclear halogen substituted derivatives thereof and nuclear alkyl substituted derivatives thereof.

25. The interpolymerization product obtained by heating a mixture comprising at least one fatty acid compound selected from the group consisting of drying and semi-drying fatty oils, drying and semi-drying fatty oil acids and drying and semi-drying oil modified alkyd resins, and an acenaphthylene compound selected from the group consisting of acenaphthylene, nuclear halogen substituted derivatives thereof, and nuclear alkyl substituted derivatives thereof, the heating being continued until the reaction product is substantially clear and homogeneous.

FRANK ARMITAGE.
ERIC SYDNEY JOHN FRY.

REFERENCES CITED

The following references are of record in the file of this patent:

UNITED STATES PATENTS

| Number | Name | Date |
|---|---|---|
| 2,392,710 | Wakeford et al. | Jan. 8, 1946 |
| 2,468,770 | Morris et al. | May 3, 1949 |
| 2,510,647 | Miller et al. | June 6, 1950 |